United States Patent [19]

Beaver

[11] Patent Number: 4,589,898
[45] Date of Patent: May 20, 1986

[54] METHOD OF CLEANING HEAT TRANSFER FINS

[75] Inventor: Richard P. Beaver, Library, Pa.

[73] Assignee: PPG Industries, Inc., Pittsburgh, Pa.

[21] Appl. No.: 682,400

[22] Filed: Dec. 17, 1984

[51] Int. Cl.$^4$ .............................................. C03B 37/02
[52] U.S. Cl. .......................................... 65/12; 65/127; 134/2; 165/95
[58] Field of Search ....................... 165/95; 65/12, 27; 134/2

[56] References Cited

U.S. PATENT DOCUMENTS

| 3,374,074 | 3/1968 | Russell et al. | 65/12 X |
| 3,376,122 | 4/1968 | Domicone et al. | 65/27 |
| 3,416,962 | 12/1968 | Storck et al. | 134/2 X |
| 3,468,644 | 9/1969 | Leaman | 65/12 |
| 3,475,148 | 10/1969 | Higginbotham | 65/2 |
| 3,671,447 | 6/1972 | Kowalski | 134/2 X |
| 3,859,132 | 1/1975 | Klasky | 134/2 |
| 3,944,499 | 3/1976 | Staniek | 134/2 |
| 4,140,506 | 2/1979 | Machlan | 65/1 |

Primary Examiner—Robert Lindsay
Attorney, Agent, or Firm—John E. Curley

[57] ABSTRACT

A method of cleaning glass volatile contaminants from the surfaces of heat transfer fins in a fin cooler of a glass fiber forming bushing assembly is disclosed. A cleaning liquid which is a dilute alcohol solution in which the alcohol is selected from the group consisting of primary and second alcohols is sprayed in a generally flat, fan shapes spray against the side and top surfaces of the cooling fins. This spray of a dilute alcohol solution removes the contaminants from the fin surfaces while not adversely affecting the glass fiber filaments being formed during running of the bushing assembly. A solution of between 0.1 to 1.0% methanol or ethylene glycol in water has been found to be particularly satisfactory in removing boron oxide contaminants from the fin surfaces.

18 Claims, 3 Drawing Figures

METHOD OF CLEANING HEAT TRANSFER FINS

FIELD OF THE INVENTION

The present invention is directed generally to a method of cleaning heat transfer fins. More particularly, the present invention is directed to a method for removing scale buildup on heat transfer fins of a fin cooler. Most specifically the present invention is directed to a method of cleaning boron oxide containing contaminants from cooling fins of a fin cooler used in glass fiber formation. The cooling fins are positioned generally beneath a glass fiber forming bushing having a plurality of orifices or tips through which streams of glass flow to form the glass fibers. The fins are placed so that their surface lies between the glass fiber filaments being formed by the bushing. Contaminants such as boron oxide deposit on the cooling fins during glass fiber formation and affect the heat transfer rates of the fins as well as causing interruption of the drawing of glass fibers from the bushing by abrading them when the buildup becomes excessive. A plurality of spray nozzles are located in the fin cooler header block and are used to spray a liquid onto the surfaces of the cooling finds which rapidly and efficiently remove boron oxide contaminants from the fin surface. The cleaning liquid is comprised of water to which has been added a small amount of any alcohol in which boron oxide is more soluble than it is in water, a preferred alcohol being methanol.

DESCRIPTION OF THE PRIOR ART

In the formation of glass fiber filaments and strands, molten glass from a suitable melter and forehearth is caused to flow through a bushing which is a container chemically resistant to molten glass having a plurality of orifices or type on its bottom surface, which divide the molten glass in the bushing into a plurality of individual streams from which glass fibers are formed as the molten glass solidifies. The so formed fibers are, as they leave the bushing, guided between a plurality of heat exchange fins such as the fins of a fin cooler assembly. These cooling fins are used to remove heat from the fibers and to establish by heat removal uniform cones of glass at the forming tips to produce uniform temperatures around each bushing tip to assist in the production of uniform diameter glass fibers. The fibers after passing the fins are typically drawn downwardly, gathered together into a strand and either collected on a rotating collet or passed through a chopper. If the heat exchange characteristics of the cooling fins vary with time it will have a detrimental effect on the quality of the glass filaments being formed since the diameters thereof will not be uniform and the resulting glass strands will be inconsistent.

A primary reason for cooling fin heat exchange capacity variance is the buildup of contaminants on the surfaces of the fins. Since the cooling fins are positioned in close proximity to the bushing tip plate and hence in close proximity to the molten glass emerging from the bushing assembly, the fins quickly start to collect contaminants which are volatilized as the molten glass enters the atmosphere. These volatilized components are attracted to the relatively cold surfaces of the fins, which are typically at temperatures below 300° F. and rapid condensation results. The chief contaminant is boron oxide, $B_2O_3$ which generally adheres tenaciously to the surfaces of the cooling fins and builds up to an extent sufficient to interfere with the heat exchange characteristics of the cooling fins. Further, if the $B_2O_3$ content of the glass batch used to provide molten glass to the bushing is high and also contains fluorine and the bushing is operated for a sufficient period of time scale buildup can reach a level such that filaments abrade against it and cause the bushing to be shut down due to excessive filament breakout.

Various prior art means have been devised to deal with the problem of contaminant buildup on the heat exchange fins of fin coolers. For example, in U.S. Pat. No. 3,475,148, there is disclosed a method and apparatus for glass filament production in which water is sprayed against the undersides of the fins to create a temperature differential between the fin and the contaminant scale thereby causing the contaminants to break away from the fins. This process is difficult to control since it must be used in such a manner that cooling of the bushing bottom adjacent to the fin does not occur and cause changes in the viscosity of the molten glass flowing out of the bushing. U.S. Pat. No. 4,140,506 to Machlan is directed to a method for forming glass filaments in which a moving gas environment is formed above the fins in an effort to minimize the accumulation of compounds of the glass volatiles on the fin surfaces.

The prior art methods for attempting to remove contaminants or to attempt to prevent their formation have not been completely satisfactory. The use of water to effect a temperature differential which causes the scale to break and fall off may also adversely affect the heat transfer rates of the heat exchange fins. The addition of a reactant gas to the area adjacent to the fin cooler and bushing assembly may have a detrimental effect on glass quality and adds additional compounds to the atmosphere in which operators must function to service the equipment being used. Mechanical abrasion of contaminated fins with wire brushes and the like has been practical but requires the removal of the fin cooler from its operating position.

A need exists for a method of cleaning the heat transfer fins of a fin cooler in a safe, expeditious, and effective manner. The heat exchange rates of the fins should not be altered during cleaning and the method of cleaning should not have a detrimental effect on the glass filaments being formed. The method of cleaning heat transfer fins in accordance with the present invention meets these criteria.

SUMMARY OF THE INVENTION

It is an object of the present invention to provide a method of cleaning heat transfer fins in an efficient, safe and economical manner.

Another object of the present invention is to provide a method for cleaning cooling fins of a fin cooler assembly that may be conducted without disrupting production and while the fin cooler is in use.

A further object of the present invention is to provide a method of cooling fin contaminant scale removal in a glass fiber forming assembly to extend the effective running life of the fins so contaminated without process interruption.

Yet another object of the present invention is to provide a method of removing boron oxide containing contaminants from cooling fins in a fiber glass forming operation.

Still a further object of the present invention is to provide a method of fin cleaning utilizing a spray of a dilute alcohol solution.

Yet still another object of the present invention is to provide a method of fin cleaning using an alcohol selected from the group consisting of primary and secondary alcohols.

Still yet a further object of the present invention is to provide a method for cleaning fin surfaces using a dilute solution of water and methanol to rapidly remove contaminants therefrom and provide clean fin surfaces for a fiber forming operation without requiring any interruption of the fiber forming process.

As will be discussed in greater detail in the description of the preferred embodiments as set forth hereafter, a spray of a fin surface cleaning liquid is directed against the sides and tops of the spaced cooling fins to effect removal of the contaminants which form thereon. In accordance with the present invention the cleaning liquid is a dilute alcohol solution in which 0.1 to 1% by volume of an alcohol selected from the group of primary and secondary alcohols is added to water. While any alcohol in which boron oxide is more soluble than it is in water can be used, the preferred alcohols are methanol or ethylene glycol.

In accordance with the present invention, the dilute alcohol solution is periodically sprayed onto the top and side surfaces of adjacent ones of the cooling fins forming a portion of the fin cooler assembly which is typically used to control glass filament temperature. This method of removing scale buildup on the fin surfaces is effective in keeping the fin surfaces free of compounds of glass volatiles without having an adverse effect on either heat exchange characteristics of the fin cooler or the under surface of the bushing which would effect the quality or uniformity of the glass fiber filaments being formed by the bushing. The dilute alcohol solution in accordance with the present invention is sprayed in a flat, fan shaped pattern which thoroughly wets the top and side surfaces of adjacent ones of the cooling fins while keeping the cleaning fluid spray away from the bushing bottom plate. This again insures that the cleaning procedure will not interfere with glass fiber filament formation since the temperature of the bottom plate is not altered during cleaning of the fins.

The method of heat transfer fin surface cleaning in accordance with the present invention provides a quick, reliable and effective method of removing compounds of glass volatiles from the surfaces of the fin coolers. The possibly detrimental side effects of the prior art fin cooling methods are avoided. At the same time, the cleaning method in accordance with the present invention does not itself adversely affect the glass fiber filament forming equipment or the formed filaments themselves.

BRIEF DESCRIPTION OF THE DRAWINGS

While the novel features of the method of heat transfer fin cleaning in accordance with the present invention are set forth with particularity in the appended claims, a full and complete understanding of the invention may be had by referring to the description of the preferred embodiments as set forth hereinafter, and as may be seen in the accompanying drawings in which;

DESCRIPTION OF THE PREFERRED EMBODIMENT

Figure 1:
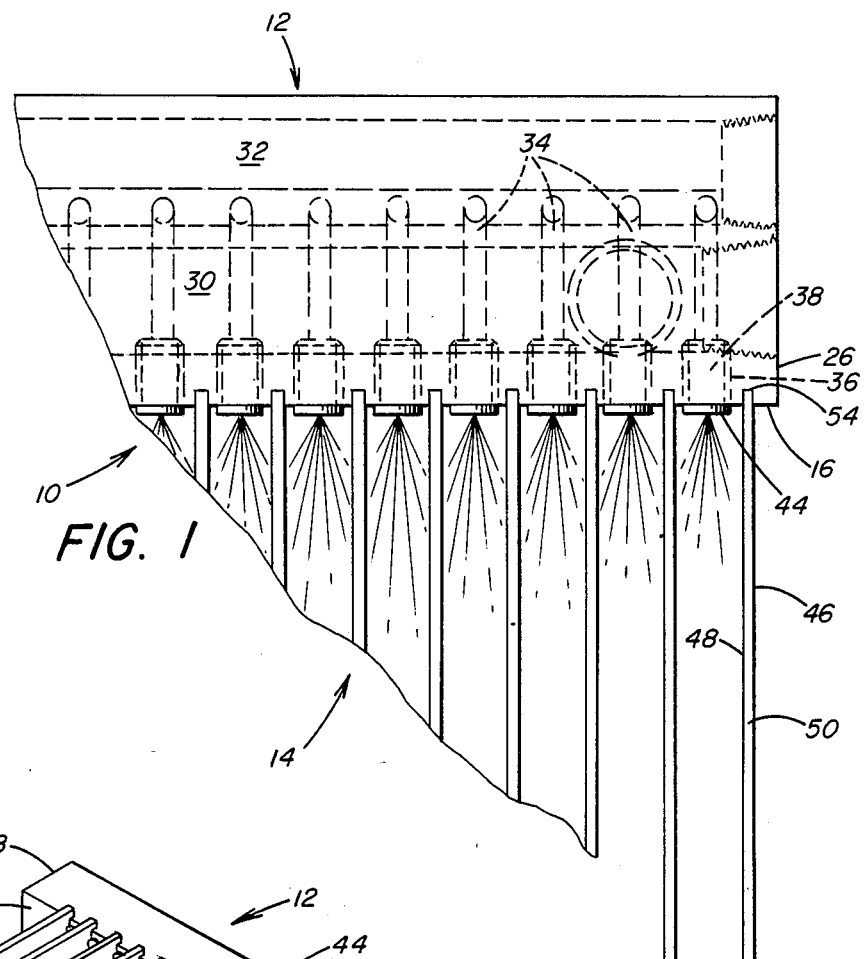
FIG. 1 is a top plan view of a portion of a self purging fin cooler assembly suitable for use with the instant invention.
Figure 2:
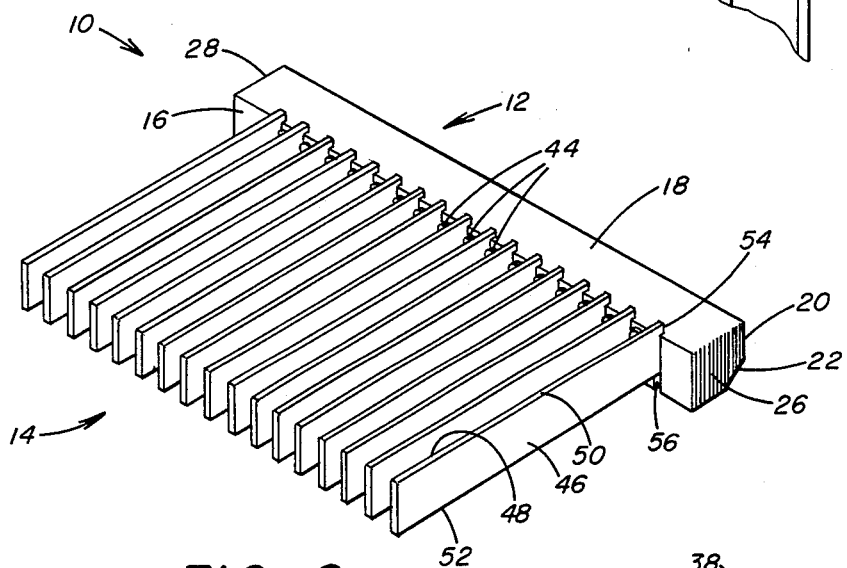
FIG. 2 is a perspective view of the fin cooler of FIG. 1.

Referring initially to FIGS. 1 and 2, there may be seen generally at 10 a self purging fin cooler for use with the subject invention. Self purging fin cooler 10 is set forth in a co-pending patent application entitled Self Purging Fin Cooler, filed on even date herewith, and assigned to a common assignee. The disclosure of the above-identified application is incorporated herein by reference. As is set forth in greater detail in the above-identified patent application, self purging fin cooler 10 is comprised of a fin cooler header block 12 from which extend a plurality of spaced, generally rectangular heat transfer fins 14. In use, the fin cooler 10 is positioned beneath a glass fiber forming bushing assembly (not shown) in the conventional manner with the cooling fins 14 being positioned generally beneath the tip plate of the bushing assembly so that glass fiber filaments drawn from the bushing pass between the various spaced heat transfer fins 14. A typical arrangement of this may be seen in U.S. Pat. No. 2,908,036. U.S. Pat. No. 3,251,665, and on pages 106-107 of the book "The Manufacturing Technology of Continuous Glass Fibers", Lowenstein, Elsevier Publishing Company, N.Y., 1973. The fins 14 receive heat from the glass fiber filaments and transfer this heat to the header block 12.

Figure 3:
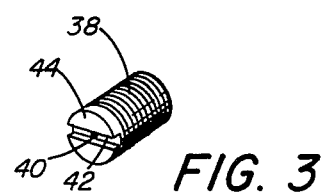
FIG. 3 is a perspective view of a spray nozzle portion of the self purging fin cooler of FIG. 1.

Header block 12 includes a front face 16 and a top surface 18. These together with rear surfaces 20 and 22 and bottom surface 24 define a generally elongated rectangular metal bar that is header block 12. Header block 12 has generally vertical end walls 26, 28 and a plurality of header blocks 12 can be placed end to end beneath the bushing assembly. As may be seen in FIG. 1, header block 12 is provided with two spaced, separate fluid flow channels. A coolant liquid flow channel 30 is placed closer to the front face 16 of header block 12 and coolant liquid, typically water, flows through coolant flow channel 30 to take up heat transferred to the header block from the cooling fins 14. A cleaning liquid flow channel 32 is located in header block 12 generally to the rear of, and slightly above coolant liquid flow channel 30. A plurality of spaced cleaning liquid distribution passages 34 extend between cleaning liquid flow channel 32 and the front face 16 of header block 12. Each of these distribution passages 34 terminates in a threaded bore 36 formed in front face 16 between each adjacent fin 14 and generally adjacent the top surface 18 of the header block 12. Each threaded bore 36 forms a purge portion that receives a threaded set screw 38. As may be seen in FIG. 3, each set screw includes a central cleaning liquid distribution bore 40 which terminates in an elongated slot 42 formed in a front surface portion 44 of set screw 38. As is discussed in greater detail in the previously referenced co-pending application, each set screw forms a spray nozzle which produces a generally flat spray of cleaning liquid.

Each heat transfer fin 14 is provided with opposed side surfaces 46, and 48, a top surface 50, and a bottom surface 52. A first end 54 of each fin 14 is received in a generally vertical slot 56 in the front face 16 of header block 12.

As may be seen most clearly in FIG. 1, the cooling fins 14 and set screw spray nozzles 38 are arranged on the front face 16 of header block 12 in a serial manner so that a spray nozzle is located between each two fins 14. In use of the self purging fin cooler, a cleaning liquid is flowed through cleaning liquid flow channel 32 and through the various distribution passages 34. The cleaning liquid then exits through the bores 40 and is shaped by the horizontally formed slot 42 into a generally planar, fan shaped spray which, as may be seen in FIG. 1, thoroughly wets the sides 46 and 48 and the top of each cooling fin 14.

The cleaning liquid utilized in accordance with the present invention is a dilute alcohol solution comprised of about 0.1 to 25% by volume, preferably 0.1 to 5% by volume, and most preferably 0.1 to 1.0% by volume of a primary or secondary alcohol in water. Suitable primary and secondary alcohols include, but are not limited to, $C_1$ to $C_{10}$ containing primary and secondary alcohols, including glycols and typified by methanol, ethanol, propanol, butanol, pentanol, hexanol, heptanol, octanol, isopropanol, 2-butanol, 2-pentanol, ethylene glycol, diethylene glycol and the like. Since the contaminants formed on the surfaces of the cooling fins 14 are primarily boron oxides, any alcohol in which boron oxide is more soluble that it is in water will be satisfactory for use in accordance with the present invention. It has been found that methanol or ethylene glycol are particularly satisfactory since they dissolve the boron oxide contaminants readily and rapidly yet do not have an adverse effect on the glass fiber filaments being formed. A spray volume of 0.05 milliliters of cleaning liquid per purge port per second for a duration of 2 seconds at a frequency of once every two hours of bushing operation has been found sufficient to completely remove all boron oxide contaminants present from the top and side surfaces of the cooling fins 14.

As is set forth in greater detail in the previously referenced, co-pending application, the structure and placement of the spray nozzles 38 provides effective distribution of the cleaning liquid to the cooling fins 14 while not causing any cooling of the bushing tip plate. In accordance with the present invention the method of spraying the cooling fins with a dilute alcohol solution is effective in removing the boron oxide and other contaminants from the surfaces of the cooling fan while not interfering with glass fiber filament formation.

While a method of cleaning heat transfer fins in accordance with the present invention has set forth fully and completely hereinabove, it will be obvious to one of skill in the art that a number of changes in, for example, the shapes of the cooling fins, the number of fins attached to each header block, the frequency and duration of the cleaning liquid spray, and the like could be made without departing from the true spirit and scope of the subject invention which is accordingly to be limited only by the following claims.

I claim:

1. A method of removing scale buildup on heat transfer fins used to cool glass cones in a fiber glass bushing assembly comprising feeding a spray of alcohol-water solution containing 0.1 to 25 percent by volume alcohol therein across the surface of the fins and below the bushing tips periodically during running of the bushing to thereby remove deposits on said fins.

2. A method of removing scale buildup on heat transfer fins used to cool glass cones from a fiber glass bushing comprising feeding a flat spray of liquid between the fin surfaces to thoroughly wet the top of the fins and the sides, said liquid spray comprising a dilute solution of an alcohol in water, said solution containing 0.1 to 25 percent by volume alcohol therein.

3. The method of claim 1, wherein the alcohol is selected from the group consisting of primary and secondary alcohols.

4. The method of claim 3, wherein the alcohol is methanol.

5. The method of claim 3 wherein the alcohol is ethylene glycol.

6. The method of claim 2, wherein the alcohol is selected from the group consisting of primary and secondary alcohols.

7. The method of claim 6, wherein the alcohol is methanol.

8. The method of claim 6, wherein the alochol is ethylene glycol.

9. A method of removing contaminant buildup from the surfaces of heat transfer fins of a fin cooler used to cool glass fiber filaments in a glass fiber forming bushing comprising the steps of:
    flowing a dilute alcohol-water solution containing 0.1 to 25 percent by volume alcohol to a plurality of spray nozzles in a header block of said fin cooler, each of said spray nozzles being located intermediate two adjacent ones of said heat transfer fins; and
    spraying said dilute alcohol-water solution onto side and top surfaces of said heat transfer fins to remove said contaminants from said fins.

10. The method of claim 9, wherein the alcohol-water solution contains an alcohol selected from the group consisting of primary and secondary alcohols.

11. The method of claim 10, wherein the alcohol is methanol.

12. The method of claim 10, wherein the alcohol is ethylene glycol.

13. The method of claim 11, wherein the methanol is present at 0.1 to 5 percent by volume.

14. The method of claim 11, wherein the methanol is present at 0.1 to 1 percent by volume.

15. The method of claim 4, wherein the methanol is present at 0.1 to 5 percent by volume.

16. The method of claim 4, wherein the methanol is present at 0.1 to 1 percent by volume.

17. The method of claim 7, wherein the methanol is present at 0.1 to 5 percent by volume.

18. The method of claim 7, wherein the methanol is present at 0.1 to 1 percent by volume.

* * * * *